US012807838B2

(12) United States Patent
Chen et al.

(10) Patent No.: US 12,807,838 B2
(45) Date of Patent: Nov. 24, 2026

(54) COATING COMPOSITION AND ITS USES

(71) Applicants: DOW GLOBAL TECHNOLOGIES LLC, Midland, MI (US); DOW SILICONES CORPORATION, Midland, MI (US)

(72) Inventors: Tingting Chen, Shanghai (CN); Yu Chen, Shanghai (CN); Hongyu Chen, Shanghai (CN); Liyun Zhou, Shanghai (CN); Kang Chen, Shanghai (CN); Yusheng Chen, Shanghai (CN); Yi Guo, Shanghai (CN); Qing Shi, Shanghai (CN); Zhihua Liu, Shanghai (CN)

(73) Assignees: DOW GLOBAL TECHNOLOGIES LLC, Midland, MI (US); DOW SILICONES CORPORATION, Midland, MI (US)

( * ) Notice: Subject to any disclaimer, the term of this patent is extended or adjusted under 35 U.S.C. 154(b) by 489 days.

(21) Appl. No.: 18/270,103

(22) PCT Filed: Dec. 28, 2021

(86) PCT No.: PCT/CN2021/141886

§ 371 (c)(1),
(2) Date: Jun. 28, 2023

(87) PCT Pub. No.: WO2022/143604

PCT Pub. Date: Jul. 7, 2022

(65) Prior Publication Data

US 2024/0084168 A1 Mar. 14, 2024

Related U.S. Application Data

(63) Continuation of application No. PCT/CN2020/141214, filed on Dec. 30, 2020.

(30) Foreign Application Priority Data

Dec. 30, 2020 (WO) ................ PCT/CN2020/141214

(51) Int. Cl.
*C09D 183/06* (2006.01)
*D06N 3/00* (2006.01)
*D06N 3/12* (2006.01)

(52) U.S. Cl.
CPC ......... *C09D 183/06* (2013.01); *D06N 3/0063* (2013.01); *D06N 3/128* (2013.01); *D06N 2203/066* (2013.01)

(58) Field of Classification Search
CPC .... C09D 183/06; D06N 3/0063; D06N 3/128; D06N 2203/066

(Continued)

(56) References Cited

U.S. PATENT DOCUMENTS

| | | | |
|---|---|---|---|
| 3,419,593 | A | 12/1968 | Willing |
| 3,715,334 | A | 2/1973 | Karstedt |

(Continued)

FOREIGN PATENT DOCUMENTS

| | | | |
|---|---|---|---|
| CN | 1372610 | A | 10/2002 |
| CN | 1702234 | A | 11/2005 |

(Continued)

OTHER PUBLICATIONS

International Search Report for PCT/CN2021/141886 dated May 9, 2022, 3 pages.

(Continued)

*Primary Examiner* — Benjamin L Utech
(74) *Attorney, Agent, or Firm* — Warner Norcross + Judd LLP

(57) ABSTRACT

The present disclosure relates to a leather coating composition comprising or consisting of a hydrosilylation curable (Continued)

silicone elastomer composition designed to be used as a topcoat for a synthetic leather material, particularly a silicone-based synthetic leather composite material. A silicone coating as a topcoat for a synthetic leather material which is the cured product of the composition, methods of making the topcoat, synthetic leather material utilizing same and uses of the synthetic leather material products are also disclosed. The topcoat is designed to provide a highly crosslinked silicone matrix containing silicon-free organic micro-particles to minimize or at least decrease change in gloss after abrasion. The leather coating composition comprises a hydrosilylation curable silicone elastomer composition, comprising: (i) at least one organopolysiloxane polymer; (ii) a reinforcing silica filler; (iii) a silicone resin cross-linker having terminal (M) groups comprising silicone bonded hydrogen; (iv) a hydrosilylation catalyst; and (v) silicon-free organic microparticles.

12 Claims, 1 Drawing Sheet

(58) Field of Classification Search
USPC .......................................................... 524/862
See application file for complete search history.

(56) References Cited

U.S. PATENT DOCUMENTS

| | | | |
|---|---|---|---|
| 3,814,730 A | 6/1974 | Karstedt | |
| 3,989,667 A | 11/1976 | Lee et al. | |
| 6,354,620 B1 | 3/2002 | Budden et al. | |
| 6,605,734 B2 | 8/2003 | Roy et al. | |
| 2010/0012902 A1 | 1/2010 | Rapson | |
| 2010/0055334 A1 | 3/2010 | Kim | |
| 2010/0190396 A1 * | 7/2010 | Nozoe | C08K 5/0091 524/588 |
| 2012/0164336 A1 | 6/2012 | Maliverney | |
| 2017/0044338 A1 | 2/2017 | Feder et al. | |
| 2018/0355552 A1 | 12/2018 | Hung et al. | |
| 2019/0390084 A1 | 12/2019 | Fan et al. | |

FOREIGN PATENT DOCUMENTS

| | | | | | |
|---|---|---|---|---|---|
| CN | 1968805 | A | | 5/2007 | |
| CN | 101037558 | A | * | 9/2007 | C14C 11/006 |
| CN | 101432366 | A | | 5/2009 | |
| CN | 101479342 | A | | 7/2009 | |
| CN | 102803414 | A | | 11/2012 | |
| CN | 205688265 | U | | 11/2016 | |
| CN | 106498759 | A | | 3/2017 | |
| CN | 106687542 | A | | 5/2017 | |
| CN | 107000394 | A | | 8/2017 | |
| CN | 107323020 | A | | 11/2017 | |
| CN | 108221398 | A | | 6/2018 | |
| WO | 2018119582 | A1 | | 7/2018 | |
| WO | 2019014403 | A1 | | 1/2019 | |
| WO | 2019056347 | A1 | | 3/2019 | |
| WO | WO-2020233268 | A1 | * | 11/2020 | D06N 3/183 |

OTHER PUBLICATIONS

Machine assisted translation of CN205688265U, obtained from https://patents.google.com on Jun. 28, 2023, 7 pages.
International Search Report for PCT/CN2020/083881 dated Jul. 1, 2020, 6 pages.
Machine assisted English translation of CN1702234A obtained from https://patents.google.com/patent on Nov. 4, 2021, 7 pages.
Machine assisted English translation of CN107323020A obtained from https://patents.google.com/patent on Nov. 4, 2021, 10 pages.
Machine assisted English translation of CN108221398A obtained from https://patents.google.com/patent on Nov. 4, 2021, 11 pages.
International Search Report for PCT/CN2019/087377 dated Feb. 26, 2020, 6 pages.
Machine assisted translation of CN1968805A, obtained from https://patents.google.com/ on Oct. 4, 2022, 33 pgs.
Machine assisted translation of CN106498759A, obtained from https://patents.google.com/ on Oct. 4, 2022, 15 pgs.

* cited by examiner

COATING COMPOSITION AND ITS USES

CROSS-REFERENCE TO RELATED APPLICATIONS

This application is the U.S. National Stage of PCT/CN2021/141886 filed on 28 Dec. 2021, which claims priority to PCT/CN2020/141214 filed on 30 Dec. 2020, the content of which is incorporated herein by reference.

The present disclosure relates to a hydrosilylation curable silicone elastomer composition as or for a topcoat for a synthetic leather material, particularly a silicone-based synthetic leather composite material, a silicone coating as a topcoat for a synthetic leather material which is the cured product of the composition, methods of making the topcoat and synthetic leather material utilizing same and uses of said synthetic leather material products. The topcoat is designed to provide a highly crosslinked silicone matrix containing silicon-free organic micro-particles to minimise or at least decrease change in gloss after abrasion.

A variety of synthetic alternatives to natural leather have been developed with polyurethane (PU) or polyvinylchloride (PVC) based materials having been mainly used. They are used in a wide variety of applications including for furniture, decoration, handbags, luggage, garments, footwear, car interiors, car seats and the like. However, to meet increasingly strict safety regulations, to be utilised as synthetic leather, they need to meet stringent physical property requirements, regarding e.g., flame retardancy, smoke density and retain a suitable adhesion strength in order to allow a coating layer not to be peeled off at the time of usage, heat resistance, contamination resistance, solvent resistance, hydrolysis resistance, and the like, are required. Often the PU and/or PVC based materials cannot satisfy the above-mentioned physical property requirements.

Other alternatives to natural leather include silicone-based synthetic leather composite materials. Such silicone-based synthetic leather composite materials can have several advantages over the PU and/or PVC based material alternatives. For example, they can generally be prepared using more eco-friendly production methods, using no plasticizer or toxic heavy metal and given the manufacture of organic synthetic leather relies on the use of environmentally problematic solvents such as dimethylformamide (DMF) which often remains, at least partially, in the synthetic leather product post manufacture.

Silicone-based synthetic leather composite materials may be made via several routes but are generally manufactured using a textile support layer and two or more layers of hydrosilylation curable liquid silicone rubber compositions and a release liner. For example, a first liquid silicone rubber (LSR) composition may be coated onto a release liner and is then cured to form a first or skin layer. A second LSR composition, usually having different physical properties to that of the first, is applied over the cured first layer to form an adhesion layer and then a textile support layer is placed onto the second LSR layer prior to cure, after which the second LSR composition is cured to form an adhesive layer situated between the skin layer and the textile support layer. The release liner is subsequently removed as and when required. A layer of hydrosilylation curable silicone elastomer composition may also be applied between the release liner and the textile layer as deemed appropriate to form a silicone-based leather composite material. For example, a third layer may be provided as a protective topcoat on top of the skin layer.

Such silicone-based synthetic leather composite materials are able to outperform conventional PU and PVC synthetic leather, from a physical property perspective because of the ability to provide, for example, better flexibility over a broad temperature range as well as excellent UV & thermal resistance. Topcoats are particularly important as they help to provide advantageous properties such as abrasion resistance, and soil resistance. They also are considered to be kind to the human skin and to provide an excellent hand-feeling for users. However, unfortunately topcoats made from such silicone-based materials, are not able to maintain the same desired appearance of gloss subsequent to abrasion. Post abrasion the gloss may either decrease or increase. Decreased gloss is caused by the appearance of abrasive patterns, due to the adhesive contact between the solid asperity of the abrasive and the surface of the silicone-based synthetic leather composite materials. It is a typical abrasive phenomenon of polymer elastomers. Alternatively, an increase in gloss may be observed for which the root cause is that the rough surface with small grain will be made smooth by repeated frictional interactions with harder materials, i.e., increased gloss which is caused by decreased surface roughness.

Hence, there remains a need for an improved silicone coating composition which is suitable, upon cure, to form a topcoat for a silicone-based synthetic leather composite material topcoat which is able to visually minimise a change in the level of gloss changes subsequent to abrasion.

There is provided a leather coating composition comprising a hydrosilylation curable silicone elastomer composition containing

- Component (i), one or more organopolysiloxane polymer(s) having a viscosity of from 1000 to 500,000 mPa·s at 25 °C with at least 5 weight % (wt. %) of the polymer(s) per molecule being unsaturated groups selected from alkenyl groups, alkynyl groups or a mixture thereof;
- Component (ii) an inorganic reinforcing silica filler optionally treated with one or more filler treating agents (to render the filler hydrophobic);
- Component (iii) a silicone resin cross-linker having terminal (M) groups comprising silicone bonded hydrogen, wherein the molar ratio of Si—H groups in component (iii) to unsaturated groups in the composition is from 0.5:1 to 20:1;
- Component (iv) a hydrosilylation catalyst; and
- Component (v) silicon-free organic microparticles having a number average particle size of from 0.5 to 5001 am determined using a field emission scanning electron microscope, which silicon-free organic microparticles are thermally stable up to a temperature of at least 180 °C, which silicon-free organic microparticles are present in the hydrosilylation curable silicone elastomer composition in an amount of from 5 to 35 wt. % of the composition.

The topcoat is designed to provide a highly crosslinked silicone matrix containing silicon-free micro-particles to decrease change in gloss after abrasion.

There is also provided a synthetic leather having a topcoat in the form of a cured layer of the leather coating composition as described herein, in particular a topcoat for a silicone-based synthetic leather composite material.

There is also provided a silicone coating formed as a reaction product of the cure of the leather coating composition described herein, methods of making the topcoat and the silicone-based synthetic leather composite material utilizing same and uses of products made out of the silicone-based synthetic leather composite material.

(i) Organopolysiloxane Polymer(s)

Component (i) of the hydrosilylation curable silicone elastomer composition of the leather coating composition is one or more organopolysiloxane polymer(s) having a viscosity of from 1000 to 500,000 mPa·s at 25 °C with at least 5 wt. % of the polymer(s) per molecule being unsaturated groups selected from alkenyl groups, alkynyl groups or a mixture thereof as determined using quantitative infra-red analysis in accordance with ASTM E168; e.g. Organopolysiloxane polymer (i) has multiple groups of the formula (I):

$$R_aSiO_{(4-a)/2} \quad (I)$$

in which each R is independently selected from an aliphatic hydrocarbyl, aromatic hydrocarbyl, or organyl group (that is any organic substituent group, regardless of functional type, having one free valence at a carbon atom). Saturated aliphatic hydrocarbyls are exemplified by, but not limited to alkyl groups such as methyl, ethyl, propyl, pentyl, octyl, undecyl, and octadecyl and cycloalkyl groups such as cyclohexyl. Unsaturated aliphatic hydrocarbyls are exemplified by, but not limited to, alkenyl groups such as vinyl, allyl, butenyl, pentenyl, cyclohexenyl and hexenyl; and by alkynyl groups. Aromatic hydrocarbon groups are exemplified by, but not limited to, phenyl, tolyl, xylyl, benzyl, styryl, and 2-phenylethyl. Organyl groups are exemplified by, but not limited to, halogenated alkyl groups such as chloromethyl and 3-chloropropyl; nitrogen containing groups such as amino groups, amido groups, imino groups, imido groups; oxygen containing groups such as polyoxyalkylene groups, carbonyl groups, alkoxy groups and hydroxyl groups. Further organyl groups may include sulfur containing groups, phosphorus containing groups and/or boron containing groups. The subscript "a" may be 0, 1, 2 or 3, but is typically mainly 2 or 3.

Siloxy groups may be described by a shorthand (abbreviated) nomenclature, namely—"M," "D," "T," and "Q", when R is an organic group, typically methyl group (further teaching on silicone nomenclature may be found in Walter Noll, Chemistry and Technology of Silicones, dated 1962, Chapter I, pages 1-9). The M group corresponds to a siloxy group where a=3, that is $R_3SiO_{1/2}$; the D group corresponds to a siloxy group where a=2, namely $R_2SiO_{2/2}$; the T group corresponds to a siloxy group where a=1, namely $R_1SiO_{3/2}$; the Q group corresponds to a siloxy group where a=0, namely $SiO_{4/2}$.

Examples of typical groups on the organopolysiloxane polymer (i) include mainly alkenyl, alkyl, and/or aryl groups. The groups may be in pendent position (on a D or T siloxy group) or may be terminal (on an M siloxy group). Hence, suitable alkenyl groups in organopolysiloxane polymer (i) typically contain from 2 to 10 carbon atoms, e.g. vinyl, isopropenyl, allyl, and 5-hexenyl, typically vinyl groups and as previously indicated are present on the polymer in an amount of at least 5 wt. % of the polymer(s) per molecule, alternatively from 5 to 15 wt. % of the polymer(s) per molecule, alternatively from 6 to 15 wt. % of the polymer(s) per molecule, alternatively from 7 to 15 wt. % of the polymer(s) per molecule which may be determined using quantitative infra-red analysis in accordance with ASTM E168.

The silicon-bonded organic groups attached to organopolysiloxane polymer (i) other than the unsaturated groups selected from alkenyl groups and/or alkynyl groups are typically selected from monovalent saturated hydrocarbon groups, which typically contain from 1 to 10 carbon atoms, and monovalent aromatic hydrocarbon groups, which typically contain from 6 to 12 carbon atoms, which are unsubstituted or substituted with groups that do not interfere with curing of this composition, such as halogen atoms. Preferred species of the silicon-bonded organic groups are, for example, alkyl groups such as methyl, ethyl, and propyl; and aryl groups such as phenyl.

The molecular structure of organopolysiloxane polymer (i) is typically linear, however, there can be some branching due to the presence of T groups (as previously described) within the molecule.

To achieve a useful level of physical properties in the elastomer prepared by curing the hydrosilylation curable silicone elastomer composition as hereinbefore described, the viscosity of organopolysiloxane polymer (i) should be at least 1000 mPa·s at 25 °C. The upper limit for the viscosity of organopolysiloxane polymer (i) is limited to a viscosity of up to 500,000 mPa·s at 25 °C.

Generally, the or each organopolysiloxane containing at least 5 wt. % of the polymer(s) per molecule of unsaturated groups selected from alkenyl groups, alkynyl groups or a mixture thereof. The amount (wt. %) of unsaturated groups present is determined using quantitative infra-red analysis in accordance with ASTM E168. Component (i) has a viscosity of from 1000 mPa·s to 500,000 mPa·s at 25 °C, alternatively 1000 mPa·s to 150,000 mPa·s at 25 °C, alternatively from 2000 mPa·s to 125,000 mPa·s at 25 °C, alternatively from 2000 mPa·s to 100,000 mPa·s at 25 °C alternatively from 5000 mPa·s to 80,000 mPa·s measured at 25 °C relying on the cup/spindle method of ASTM D1084-16 Method B, using an appropriate spindle for the viscosity range unless otherwise indicated.

The organopolysiloxane polymer (i) may be selected from polydimethylsiloxanes, alkylmethylpolysiloxanes, alkylarylpolysiloxanes or copolymers thereof containing e.g. alkenyl and/or alkynyl groups and may have any suitable terminal groups, for example, they may be trialkyl terminated, alkenyldialkyl terminated or may be terminated with any other suitable terminal group combination providing each organopolysiloxane polymer (i) contains at least 5 wt. % of the polymer(s) per molecule as previously discussed.

Hence the Organopolysiloxane polymer (i) may be, for the sake of example, dimethylvinyl terminated polydimethylsiloxane, dimethylvinyl terminated dimethylmethylphenylsiloxane, trialkyl terminated dimethylmethylvinyl polysiloxane or dialkylvinyl terminated dimethylmethylvinyl polysiloxane copolymers, although given the high level of alkenyl and/or alkynyl groups present alternatively trialkyl terminated dimethylmethylvinyl polysiloxane or dialkylvinyl terminated dimethylmethylvinyl polysiloxane copolymers.

For example, an organopolysiloxane polymer (i) containing unsaturated groups selected from alkenyl groups and/or alkynyl groups at the two terminals may be represented by the general formula (II):

$$R'R''R'''SiO-(R''R'''SiO)_m-SiOR'''R''R' \quad (II)$$

In formula (II), each R' may be an alkenyl group or an alkynyl group, which typically contains from 2 to 10 carbon atoms. Alkenyl groups include but are not limited to vinyl, propenyl, butenyl, pentenyl, hexenyl an alkenylated cyclohexyl group, heptenyl, octenyl, nonenyl, decenyl or similar linear and branched alkenyl groups and alkenylated aromatic ringed structures. Alkynyl groups may be selected from but are not limited to ethynyl, propynyl, butynyl, pentynyl, hexynyl, an alkynylated cyclohexyl group, heptynyl, octynyl, nonynyl, decynyl or similar linear and branched alkenyl groups and alkenylated aromatic ringed structures.

R" does not contain ethylenic unsaturation, each R" may be the same or different and is individually selected from monovalent saturated hydrocarbon group, which typically contain from 1 to 10 carbon atoms, and monovalent aromatic hydrocarbon group, which typically contain from 6 to 12 carbon atoms. R" may be unsubstituted or substituted with one or more groups that do not interfere with curing of the hydrosilylation curable silicone elastomer composition described herein, such as halogen atoms. R'" is R' or R".

Organopolysiloxane polymer (i), is typically present in an amount of from 3, alternatively from 10 wt. % of the composition, to 50 wt. %, alternatively 45 wt. % of the composition, for example organopolysiloxane polymer (i) may be present in a range of from 10 to 50 wt. %, alternatively from 10 to 45 wt. % of the composition.

(ii) Reinforcing Silica Filler

Component (ii) of the leather coating composition comprising a hydrosilylation curable silicone elastomer composition is a reinforcing silica filler. Preferably Component (ii) of the leather coating composition comprising a hydrosilylation curable silicone elastomer composition is a reinforcing silica filler which is preferably provided in a finely divided form. Reinforcing silica fillers (ii) are often treated with one or more known filler treating agents to prevent a phenomenon referred to as "creping" or "crepe hardening" during processing of the hydrosilylation curable silicone elastomer composition.

Precipitated and/or fumed silicas, alternatively fumed silica is/are particularly preferred because of their relatively high surface area, which is typically at least 50 $m^2/g$ (BET method in accordance with ISO 9277: 2010). Fillers having surface areas of from 50 to 450 $m^2/g$ (BET method in accordance with ISO 9277: 2010), alternatively of from 50 to 300 $m^2/g$ (BET method in accordance with ISO 9277: 2010), are typically used. Both types of silica are commercially available. Preferably they are provided in a finely divided form.

The amount of reinforcing silica filler (ii) e.g., finely divided silica in the hydrosilylation curable silicone elastomer composition herein is from 5 to 40 wt. %, alternatively from 5 to 30 wt. %. In some instances, the amount of reinforcing silica filler may be from 7.5 to 30 wt. %., alternatively from 10 to 30 wt. %. based on the weight of the composition, alternatively from 15 to 30 wt. %. based on the weight of the composition.

When reinforcing silica filler (ii) is naturally hydrophilic (e.g., untreated silica fillers), it is typically treated with a treating agent to render it hydrophobic. These surface modified reinforcing silica fillers (ii) do not clump and can be homogeneously incorporated into organopolysiloxane polymer (i) as the surface treatment makes the fillers easily wetted by organopolysiloxane polymer (i). This results in improved room temperature mechanical properties of the hydrosilylation curable silicone elastomer compositions and resulting cured materials cured therefrom.

The surface treatment may be undertaken prior to introduction in the composition or in situ (i.e., in the presence of at least a portion of the other components of the composition herein by blending these components together at room temperature or above until the filler is completely treated. Typically, untreated reinforcing silica filler (ii) is treated in situ with a treating agent in the presence of organopolysiloxane polymer (i), whereafter mixing a silicone rubber base material is obtained, to which other components may be added.

Typically reinforcing silica filler (ii) may be surface treated with any low molecular weight organosilicon compounds disclosed in the art applicable to prevent creping of the hydrosilylation curable silicone elastomer composition during processing. For example, organosilanes, organopolysiloxanes, or organosilazanes e.g., hexalkyl disilazane, short chain siloxane diols or fatty acids or fatty acid esters such as stearates to render the filler(s) hydrophobic and therefore easier to handle and obtain a homogeneous mixture with the other components. Specific examples include but are not restricted to silanol terminated trifluoropropylmethyl siloxane, silanol terminated ViMe siloxane, tetramethyldi (trifluoropropyl)disilazane, tetramethyldivinyl disilazane, silanol terminated MePh siloxane, liquid hydroxyl-terminated polydiorganosiloxane containing an average from 2 to 20 repeating groups of diorganosiloxane in each molecule, hexaorganodisiloxane, hexaorganodisilazane. A small amount of water can be added together with the silica treating agent(s) as a processing aid.

The filler may be introduced into the hydrosilylation curable silicone elastomer composition in the form of a masterbatch or base comprising said filler and an organopolysiloxane polymer. The organopolysiloxane polymer used for the masterbatch or base may be of a similar structure to component (i) but alternatively may be an organopolysiloxane polymer having a viscosity in the same range as component (i) but having an alkenyl and/or alkynyl content of <5 wt. % (ASTM E168) of the polymer. If required, the fumed silica may be hydrophobically treated in situ during the preparation of the masterbatch by the introduction of suitable hydrophobing agents into the mixture.

The hydrosilylation curable silicone elastomer composition as described herein is cured using a hydrosilylation cure package comprising an organohydrogenpolysiloxane having 3 or more silicon-bonded hydrogen atoms per molecule (Component iii) and a hydrosilylation catalyst (component iv).

(iii) Organohydrogenpolysiloxane

Component (iii) of the leather coating composition comprising the hydrosilylation curable silicone elastomer composition is a silicone resin cross-linker having terminal groups comprising silicone bonded hydrogen, which operates as a cross-linker for polymer (i), by the addition reaction of the silicon-bonded hydrogen atoms in component (iii) with the alkenyl groups and/or alkynyl groups in component (i) under the catalytic activity of component (iv) to be mentioned below. Component (iii) contains at least 5,000 parts per million (ppm) of silicon bonded hydrogen (Si—H), alternatively at least 7000 ppm, alternatively from 7000 to 12,000 ppm of silicon bonded hydrogen, alternatively 8000 ppm to 11,000 ppm of silicon bonded hydrogen so that the silicon bonded hydrogen atoms of this component can sufficiently react with the alkenyl groups and/or alkynyl groups, typically alkenyl groups, especially vinyl groups of component (i) to form a network structure therewith and thereby cure the composition. The quantity of silicon bonded hydrogen present is also determined using quantitative infrared analysis in accordance with ASTM E168.

The molecular configuration of component (iii) is resinous, comprising a mixture of Q, T, D and M groups and has a viscosity of from 10 to 5000 mPa·s at 25 °C, alternatively 10 to 1000 mPa·s at 25 °C, alternatively 10 to 500 mPa·s at 25 °C using a Brookfield DV 3T Rheometer to obtain a good miscibility with component (i).

Examples of component (iii) of the leather coating composition comprising the hydrosilylation curable silicone elastomer composition include but are not limited to:

silicone resins comprising or consisting of Si—H containing M groups such as $(CH_3)_2HSiO_{1/2}$ groups, trialkyl M groups such as $(CH_3)_3SiO_{1/2}$ groups and $SiO_{4/2}$ groups, silicone resins comprising or consisting of Si—H containing M groups such as $(CH_3)_2HSiO_{1/2}$ groups and $SiO_{4/2}$ groups, silicone resins comprising or consisting of Si—H containing M groups such as $(CH_3)_2HSiO_{1/2}$ groups, $(CH_3)_2SiO_{2/2}$ groups and $SiO_{4/2}$ groups, silicone resins comprising or consisting of Si—H containing M groups such as $(CH_3)_2HSiO_{1/2}$ groups, $SiO_{4/2}$ groups and $(C_6H_5)_3SiO_{1/2}$ groups, and alternatives in which methyl is replaced by phenyl groups or other alkyl groups or mixtures thereof. The silicone resins may also comprise T groups and/or D groups, alternatively T groups.

Optionally, other cross-linkers may additionally be utilised. These may include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, trimethylsiloxy-end-blocked methylhydrogenpolysiloxane, trimethylsiloxy-end-blocked dimethylsiloxane/methylhydrogensiloxane copolymers, dimethylhydrogensiloxy-end-blocked dimethylpolysiloxane, dimethylhydrogensiloxy-end-blocked dimethylsiloxane/methylhydrogensiloxane copolymers, trimethylsiloxy-end-blocked methylhydrogensiloxane/diphenylsiloxane copolymers, trimethylsiloxy-end-blocked methylhydrogensiloxane/diphenylsiloxane/-dimethylsiloxane copolymers, trimethylsiloxy-end-blocked methylhydrogensiloxane/methylphenylsiloxane/-dimethylsiloxane copolymers, dimethylhydrogensiloxy-end-blocked/dimethylsiloxane/-diphenylsiloxane copolymers and/or dimethylhydrogensiloxy-end-blocked methylhydrogensiloxane/dimethylsiloxane/-methylphenylsiloxane copolymers. However, it is preferred that component (iii) is one or more silicone resin as described above.

Component (iii) is typically present in the total composition in an amount of from 5 to 30 wt. %, 5 to 20 wt. %, alternatively from 10 to 20 wt. % of the composition but the amount present is typically determined by the molar ratio of the silicon-bonded hydrogen atoms in component (iii) to the total number of all unsaturated groups, e.g. alkenyl and alkynyl groups, often vinyl groups. In the present composition the molar ratio of the silicon-bonded hydrogen atoms in component (iii) to the total number of all unsaturated groups is from 0.5:1 to 20:1, alternatively from 0.5:1 to 10:1, alternatively from 0.5:1 to 5:1, alternatively from 1:1 to 5:1 preferably with Si—H being in excess.

iv) Hydrosilylation Catalyst

As hereinbefore described the leather coating composition is cured via a hydrosilylation (addition) reaction catalysed by a hydrosilylation (addition cure) catalyst (iv) that is a metal selected from the platinum metals, i.e., platinum, ruthenium, osmium, rhodium, iridium and palladium, or a compound of such metals. Platinum and rhodium compounds are preferred due to the high activity level of these catalysts for hydrosilylation reactions.

The Catalyst (iv)

The catalyst (iv) can be a platinum group metal, a platinum group metal deposited on a carrier, such as activated carbon, metal oxides, such as aluminum oxide or silicon dioxide, silica gel or powdered charcoal, or a compound or complex of a platinum group metal.

Examples of preferred hydrosilylation catalysts (iv) are platinum-based catalysts, for example, platinum black, platinum oxide (Adams catalyst), platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups. Soluble platinum compounds that can be used include, for example, the platinum-olefin complexes of the formulae $(PtCl_2\cdot(olefin)_2$ and $H(PtCl_3\cdot olefin)$, preference being given in this context to the use of alkenes having 2 to 8 carbon atoms, such as ethylene, propylene, isomers of butene and of octene, or cycloalkanes having five to seven carbon atoms, such as cyclopentene, cyclohexene, and cycloheptene. Other soluble platinum catalysts are, for the sake of example a platinum-cyclopropane complex of the formula $(PtCl_2C_3H_6)_2$, the reaction products of hexachloroplatinic acid with alcohols, ethers, and aldehydes or mixtures thereof, or the reaction product of hexachloroplatinic acid with methylvinylcyclotetrasiloxane in the presence of sodium bicarbonate in ethanolic solution. Platinum catalysts with phosphorus, sulfur, and amine ligands can be used as well, e.g., $(Ph_3P)_2PtCl_2$; and complexes of platinum with vinylsiloxanes, such as sym-divinyltetramethyldisiloxane.

Hence, specific examples of suitable platinum-based catalysts include (i) complexes of chloroplatinic acid with organosiloxanes containing ethylenically unsaturated hydrocarbon groups are described in U.S. Pat. No. 3,419,593;

(ii) chloroplatinic acid, either in hexahydrate form or anhydrous form;

(iii) a platinum-containing catalyst which is obtained by a method comprising reacting chloroplatinic acid with an aliphatically unsaturated organosilicon compound, such as divinyltetramethyldisiloxane;

(iv) alkene-platinum-silyl complexes as described in U.S. Pat. No. 6,605,734 such as $(COD)Pt(SiMeCl_2)_2$ where "COD" is 1,5-cyclooctadiene; and/or (v) Karstedt's catalyst, a platinum divinyl tetramethyl disiloxane complex typically containing about 1 wt. % of platinum in a solvent, such as toluene may be used. These are described in U.S. Pat. Nos. 3,715,334 and 3,814,730.

The hydrosilylation catalyst (iv) of the hydrosilylation curable silicone elastomer composition is present in the total composition in a catalytic amount, i.e., an amount or quantity sufficient to catalyse the addition/hydrosilylation reaction and cure the composition to an elastomeric material under the desired conditions. Varying levels of the hydrosilylation catalyst (iv) can be used to tailor reaction rate and cure kinetics. The catalytic amount of the hydrosilylation catalyst (iv) is generally between 0.01 ppm, and 10,000 parts by weight of platinum-group metal, per million parts (ppm), based on the weight of the composition; alternatively, between 0.01 and 5000 ppm; alternatively, between 0.01 and 3,000 ppm, and alternatively between 0.01 and 1,000 ppm. In specific embodiments, the catalytic amount of the catalyst may range from 0.01 to 1,000 ppm, alternatively 0.01 to 750 ppm, alternatively 0.01 to 500 ppm and alternatively 0.01 to 100 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.001 to 3.0 wt. % of the composition, alternatively, from 0.01 to 3.0 wt. % of the composition, alternatively, from 0.1 to 3.0 wt. % of the composition, alternatively from 0.1 to 2.0 wt. % % of the composition, alternatively from 0.1 to 1.5 wt. % of the composition.

(v) Silicon-Free Organic Microparticles

Component (v) of the hydrosilylation curable silicone elastomer composition herein, are silicon-free organic microparticles having a number average particle size of from 0.5 to 500 μm, alternatively 0.5 to 250 μm, alternatively 0.5 to 100 μm, alternatively 0.5 to 75 μm, alternatively 1.0 to 50 μm. The number average particle sizes may be measured using a field emission scanning electron microscope such as a FEI Nova NanoSEM™ 630 scanning electron microscope from Thermo Fisher Scientific. For example, this may be achieved by taking a field emission scanning electron microscope photograph of the particles and then selecting 10 particles randomly from the photograph and measuring the diameter of each of particle in the images Then the average diameter is calculated for the particles selected.

The silicon-free organic microparticles of component (v) are thermally stable up to a temperature of at least 180 °C and are present in the composition in an amount of from 5 to 35 wt. %, alternatively in an amount of from of from 5 to 30 wt. %, alternatively in an amount of from 5 to 25 wt. % of the composition. They are required to be thermally stable throughout the cure process which is typically held at a temperature between 80 °C and 180 °C. By "thermally stable" we mean that the silicon-free organic microparticles do not thermally degrade at temperatures at or below 180 °C. This is determined by placing a sample of silicon-free organic microparticles in a suitable container and then placing the container into a preheated oven at a temperature of 180 °C and atmospheric pressure, for a period of 30 minutes. After the 30 minutes in the oven the sample is visually assessed to determine whether the microparticles appear to be in their original form in which case they are deemed thermally stable up to a temperature of 180 °C. (pass) or whether they have visually degraded in some way which is visually evident e.g., by agglomeration, liquefaction, carbonization and/or decomposition.

The component (v) silicon-free organic microparticles are generally or preferably spherical and/or quasi-spherical in shape. The component (v) silicon-free organic microparticles may be thermoset materials. Furthermore, for the avoidance of doubt the component (v) silicon-free organic microparticles are silicon-free, allowing only for trace contamination, i.e., the silicon-free organic microparticles contain substantially no silicon atoms or silicon containing compounds. The term substantially used above is intended to mean that only trace amounts of silicon are present, typically in the form of impurities.

Component (v) the silicon-free organic microparticles may be made of any suitable organic materials, providing they meet the predefined requirements they may selected from polyurethane microparticles, acrylic microparticles, methacrylic microparticles, polytetrafluoroethylene microparticles, polyester microparticles, polyamide microparticles and/or polyolefin microparticles, and derivatives and or mixtures thereof. For example, they may comprise, but are not limited to one or more of polyethylene, polystyrene, polyvinyl acetate, polyvinyl chloride, polyvinylidene chloride, polyacrylonitrile, polymethyl methacrylate, polybutadiene, polychloroprene, and other vinyl polymers and copolymers thereof; Nylon 6, Nylon 66, and other polyamides; and polyethylene terephthalate, polyacetal, and blends thereof. It was found that the silicon-free organic microparticles of component (v) were successful as a means of minimising visual changes in gloss after abrasion because whilst the small grains on the leather surface will be worn away during abrasion, the appearance of the micro-particles at the topcoat surface will help to compensate for the loss of surface roughness, so as to avoid, in this case, increased gloss. In addition, the presence of the robust silicon-free organic microparticles at the topcoat surface will help to avoid further abrasion of the matrix.

Optional Additives

The leather coating composition may comprise one or more additives. Examples of these optional additives include cure inhibitors, cured silicone elastomer powder, inorganic non-reinforcing fillers, electrically conductive additives, pot life extenders, lubricants, flame retardants, pigments, colouring agents, chain extenders, heat stabilizers, diluents (designed to evaporate during cure), compression set improvement additives, antisqueak agents, antioxidants, antistatic agents, anti-soiling agents and light stabilizers, anti-freeze agents and/or biocides and mixtures thereof.

Inhibitor

Optionally, to obtain a longer working time or pot life of the hydrosilylation curable silicone elastomer composition used in or as the leather coating composition because a hydrosilylation cure system is being utilised, a suitable inhibitor may be incorporated into the composition in order to retard or suppress the activity of the catalyst.

Inhibitors of platinum metal-based catalysts, generally a platinum metal-based catalyst is well known in the art. Hydrosilylation or addition-reaction inhibitors include hydrazines, triazoles, phosphines, mercaptans, organic nitrogen compounds, acetylenic alcohols, silylated acetylenic alcohols such as methyl (tris(1,1-dimethyl-2-propynyloxy)) silane, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines. Alkenyl-substituted siloxanes as described in U.S. Pat. No. 3,989,667 may be used, of which cyclic methylvinylsiloxanes are preferred.

Another class of known inhibitors of platinum catalysts includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25 °C. Hydrosilylation curable silicone elastomer compositions containing these inhibitors typically require heating at temperature of 70 °C or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargyl alcohol, 3,5-dimethyl-1-hexyn-3-ol, 1-ethynylcyclopentanol, 1-phenyl-2-propynol, 3-methyl-1-penten-4-yn-3-ol, and mixtures thereof.

When present, inhibitor concentrations as low as 1 mole of inhibitor per mole of the metal of catalyst (iv) will in some instances impart satisfactory storage stability and cure rate. In other instances, inhibitor concentrations of up to 500 moles of inhibitor per mole of the metal of catalyst (iv) are required. The optimum concentration for a given inhibitor in a given composition is readily determined by routine experimentation. Dependent on the concentration and form in which the inhibitor selected is provided/available commercially, when present in the composition, the inhibitor is typically present in an amount of from 0.0125 to 10 wt. % of the composition. Mixtures of the above may also be used.

Cured Silicone Elastomer Powder

Another optional additive which may be included in the hydrosilylation curable silicone elastomer composition is a suitable cured silicone elastomer powder. The cured silicone elastomer powder may have any suitable average particle size, for example, from 0.01 to 100 μm, alternatively 0.01 to 50 μm, alternatively from 0.01 to 25 μm. as measured using the Dow Silicone Corporation Corporate Test Method CTM 1138 which is available to the public upon request. They may contain chemically functional groups, e.g., epoxy groups (meth)acryloxy groups or may be coated e.g., with a silica treated coating.

The cured silicone elastomer powder is made from a suitable curable silicone composition. These may include, for example, addition (hydrosilylation) reaction-curing silicone compositions, condensation reaction-curing silicone compositions, organoperoxide-curing silicone compositions, and ultraviolet-curing silicone compositions. Addition reaction-curing and condensation reaction-curing silicone compositions are preferred for their ease of handling.

Commercial examples which may be utilised as component (v) include, for the sake of example, Dowsil™ 23N Additive, Dowsil™ 603T additive and Dowsil™ 9701 Cosmetic Powder from Dow Silicones Corporation.

When present, the cured silicone rubber powder is present in the hydrosilylation curable silicone elastomer composition in an amount of from 2.5 to 20 wt. % of the composition, alternatively from 2.5 to 15 wt. % of the composition, alternatively from 2.5. to 10 wt. % of the composition.

Inorganic Non-Reinforcing Filler

Inorganic non-reinforcing fillers, when present, in the hydrosilylation curable silicone elastomer composition, may comprise crushed quartz, diatomaceous earths, barium sulphate, iron oxide, titanium dioxide and carbon black, wollastonite and platelet type fillers such as, graphite, graphene, talc, mica, clay, sheet silicates, kaolin, montmorillonite and mixtures thereof. Other inorganic non-reinforcing fillers which might be used alone or in addition to the above include aluminite, calcium sulphate (anhydrite), gypsum, calcium sulphate, magnesium carbonate, aluminium trihydroxide, magnesium hydroxide (brucite), graphite, copper carbonate, e.g., malachite, nickel carbonate, e.g., zarachite, barium carbonate, e.g., witherite and/or strontium carbonate e.g., strontianite.

Inorganic non-reinforcing fillers when present may alternatively or additionally be selected from aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3 \cdot 2SiO_2$; kyanite; and $Al_2SiO_5$. The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

Suitable sheet silicates e.g., silicate minerals which may be utilised include but are not limited to mica; $K_2Al_{14}[Si_6Al_2O_{20}](OH)_4$; pyrophyllite; $Al_4[Si_8O_{20}](OH)_4$; talc; $Mg_6[Si_5O_{20}](OH)_4$; serpentine for example, asbestos; Kaolinite; $Al_4[Si_4O_{10}](OH)_8$; and vermiculite. When present, the non-reinforcing filler(s) is/are present up to a cumulative total of from 1 to 50 wt. %. of the composition.

Whenever deemed necessary the non-reinforcing filler may also be treated as described above with respect to the reinforcing silica fillers (ii) to render them hydrophobic and thereby easier to handle and obtain a homogeneous mixture with the other components. As in the case of the reinforcing silica fillers (ii) surface treatment of the non-reinforcing fillers makes them easily wetted by organopolysiloxane polymer (i) and silicon-free organic microparticles (v) when present which may result in improved properties of the hydrosilylation curable silicone elastomer compositions, such as better processability (e.g., lower viscosity, better mold releasing ability and/or less adhesive to processing equipment, such as two roll mill), heat resistance, and mechanical properties.

Any suitable antioxidants, antistatic agents, anti-soiling agents and/or light stabilizers may be utilised in the composition.

Preferably the electrically conductive additives which may be used herein are inorganic. Examples of electrically conductive additives which may be present in the composition include metal particles, metal oxide particles, metal-coated metallic particles (such as silver-plated nickel), metal coated non-metallic core particles (such as silver coated talc, or mica or quartz) and a combination thereof. Metal particles may be in the form of powder, flakes or filaments, and mixtures or derivatives thereof.

Pot life extenders, such as triazole, may be used, but are not considered necessary in the scope of the present invention. The hydrosilylation curable silicone elastomer composition may thus be free of pot life extender.

In the case of lubricants, the lubricants may be reactive with other ingredients of the composition or unreactive therewith. They may include organopolysiloxanes having an analogous basic structure to that of component (i) but only having one unsaturated group e.g., one alkenyl group per molecule. Alternatively, the lubricant may be an organic wax or the like. When reactive the wax may for example be alkenylated wax having from 15 to 30 carbons per molecule, alternatively having from 15 to 30 carbons per molecule with at least one alkenylated group e.g., a vinyl group per molecule.

Unreactive lubricants may be present in the composition if desired these may include but are not limited to boron nitride, graphite, molybdenum sulfide and the like, or mixtures thereof.

Examples of flame retardants include aluminium trihydrate, magnesium hydroxide, calcium carbonate, zinc borate, wollastonite, mica and chlorinated paraffins, hexabromocyclododecane, triphenyl phosphate, dimethyl methylphosphonate, tris(2,3-dibromopropyl) phosphate (brominated tris), and mixtures or derivatives thereof.

Examples of pigments include carbon black, iron oxides, titanium dioxide, chromium oxide, bismuth vanadium oxide and mixtures or derivatives thereof.

Examples of colouring agents include vat dyes, reactive dyes, acid dyes, chrome dyes, disperse dyes, cationic dyes and mixtures thereof.

Where the optional additives may be used for more than one reason e.g., as a non-reinforcing filler and flame retardant, when present they may function in both roles. When or if present, the aforementioned additional components are cumulatively present in an amount of from 0.1 to 30 wt. %, alternatively of from 0.1 to 20 wt. % of the composition.

In order to prevent premature cure in storage, the composition is stored prior to use in two-parts, Part A and part B. Typically, part A contains some of organopolysiloxane polymer (i) and reinforcing silica filler (ii) and hydrosilylation catalyst (iv) and part B will contain the remainder of organopolysiloxane polymer (i) and reinforcing silica filler (ii) together with components organohydrogenpolysiloxane (iii) and, usually if present, the inhibitor, but this can vary dependent on the choice of the inhibitor used. The two-part composition may be designed to be mixed together in any suitable ratio, dependent on the amounts of organopolysiloxane polymer (i) and reinforcing silica filler (ii) in part B and as such can be mixed in a Part A:Part B weight ratio of from 15:1 to 1:2 but are preferably mixed in a Part A:Part B weight ratio of from 2:1 to 1:2, alternatively from 1.5:1 to 1:1.5, alternatively 1:1.

Optional additives may be introduced into the silicone elastomeric composition in either Part A or part B as required providing they do not cause a negative effect on any of the other ingredients in that respective part.

The individual parts of the hydrosilylation curable silicone elastomer composition used for the leather coating composition may be prepared in any way suitable. Any mixing techniques and devices described in the prior art can be used for this purpose. The particular device to be used will be determined dependent on the viscosities of components and the final curable coating composition. Suitable mixers include but are not limited to paddle type mixers e.g., planetary mixers and kneader type mixers. Cooling of components during mixing may be desirable to avoid premature curing of the composition.

As previously discussed, component (ii) the reinforcing silica filler may be introduced into the composition in the form of a fumed silica masterbatch used to introduce fumed silica into both part A or Part B of the composition may comprise from 25 to 45 wt. % of fumed silica and from 55 to 75 wt. % of organopolysiloxane containing at least 2 alkenyl and/or alkynyl groups per molecule. The organopolysiloxane may be component (i) above and/or an organopolysiloxane in the same viscosity range as component (i) but having an alkenyl and/or alkynyl content of <5 wt. % of the polymer. In one embodiment the organopolysiloxane containing at least 2 alkenyl and/or alkynyl groups per molecule in the fumed silica masterbatch is a dimethylvinyl terminated polydimethylsiloxane having a viscosity of between 30,000 and 80,000 mPa·s at 25 °C and a vinyl content of from 0.05 to 0.2 wt. % of the polymer, alternatively a vinyl content of from 0.05 to 0.15 wt. % of the polymer determined using quantitative infra-red analysis in accordance with ASTM E168. Such a masterbatch may comprise just the fumed silica and polymer but may optionally also contain small amounts of other ingredients such as hexamethyldisilazane (HMDZ), divinyltetramethyldisiloxane, dimethylhydroxy terminated methylvinyl siloxane polymer having a viscosity of 10 to 100 mPa·s and a vinyl content of 5 to 20 wt. %, alternatively 7.5 to 15 wt. % of said polymer (determined using quantitative infra-red analysis in accordance with ASTM E168); and/or water.

Hence, when Part A and Part B are mixed together the hydrosilylation curable silicone elastomer composition may comprise:

Component (i) one or more organopolysiloxane polymer(s) having a viscosity of from 1000 to 500,000 mPa·s at 25 °C alternatively 1000 mPa·s to 150,000 mPa·s at 25 °C, alternatively from 2000 mPa·s to 125,000 mPa·s at 25 °C, alternatively from 2000 mPa·s to 100,000 mPa·s at 25 °C alternatively from 5000 mPa·s to 80,000 mPa·s measured at 25 °C with at least 5 wt. % of the polymer(s) per molecule, alternatively from 5 to 15% wt. % of the polymer(s) per molecule, alternatively from 6 to 15 wt. % of the polymer(s) per molecule, alternatively from 7 to 15 wt. % of the polymer(s) per molecule being unsaturated groups selected from alkenyl groups, alkynyl groups or a mixture thereof; in an amount of from 3, alternatively from 10 wt. % of the composition, to 50 wt. %, alternatively 45 wt. % of the composition, for example organopolysiloxane polymer (i) may be present in a range of from 10 to 50 wt. %, alternatively from 10 to 45 wt. % of the composition.

Component (ii) a reinforcing silica filler, i.e., a fumed silica which is preferably hydrophobically treated which may be introduced directly into the composition or may be introduced in the form of a masterbatch; wherein the BET surface area is generally at least 50 $m^2/g$ (BET method in accordance with ISO 9277: 2010). Fillers having surface areas of from 50 to 450 $m^2/g$ (BET method in accordance with ISO 9277: 2010), alternatively of from 50 to 300 $m^2/g$ with amount of reinforcing silica filler (ii) e.g., finely divided silica in the hydrosilylation curable silicone elastomer composition herein is from 5 to 40 wt. %, alternatively of from 5 to 30 wt. %. In some instances, the amount of reinforcing silica filler may be of from 7.5 to 30 wt. %., alternatively from 10 to 30 wt. %. of the composition, alternatively from 15 to 30 wt. %. of the composition; when in the form of a masterbatch, the masterbatch may comprise from 25 to 45 wt. % of fumed silica and from 55 to 75 wt. % of component (i) and/or a dimethylvinyl terminated polydimethylsiloxane having a viscosity of between 50,000 and 80,000 mPa·s at 25 °C and a vinyl content of from 0.05 to 0.2 wt. % of the polymer, alternatively a vinyl content of from 0.05 to 0.15 wt. % of the polymer; alternatively 55 to 75 wt. % of a dimethylvinyl terminated polydimethylsiloxane as described above. The masterbatch composition may also initially include treating agents for the in situ treating of the filler to render it hydrophobic and therefore easier to mix with the polymer;

Component (iii) a silicone resin cross-linker having terminal groups comprising silicone bonded hydrogen, containing at least 5,000 parts per million (ppm) of silicon bonded hydrogen (Si—H), alternatively at least 7000 ppm, alternatively from 7000 to 12,000 ppm of silicon bonded hydrogen, alternatively 8000 ppm to 11,000 ppm of silicon bonded hydrogen, present in the total composition in an amount of from 10 to 30 wt. %, alternatively from 10 to 20 wt. % of the Part B composition, alternatively from 12 to 20 wt. % of the Part B composition but the amount present is typically determined by the molar ratio of the silicon-bonded hydrogen atoms in component (iii) to the total number of all unsaturated groups which is from 0.5: 1 to 20: 1, alternatively from 0.5: 1 to 10: 1, alternatively from 0.5: 1 to 5: 1, alternatively from 1: 1 to 5: 1 preferably with Si—H being in excess; the viscosity of component (iii) is from 15 to 50 mPa·s at 25 °C, alternatively from 15 to 40 mPa·s at 25 °C, alternatively from 20 to 35 mPa·s at 25 °C;

Component (iv) a hydrosilylation catalyst composition provided the amount of catalyst present will be within the range of from 0.01 to 3.0 wt. % of the composition, alternatively, from 0.1 to 3.0 wt. % of the composition, alternatively from 0.1 to 2.0% of the composition, alternatively from 0.1 to 1.5% of the composition and containing from between 0.01 ppm, and 10,000 parts by weight of platinum-group metal, per million parts (ppm), based on the combined weight of the components (i) and (ii) and (v) when present; alternatively, between 0.01 and 7500 ppm; alternatively, between 0.01 and 3,000 ppm, and alternatively between 100 and 6,000 ppm; and Component (v) are silicon-free organic microparticles having a number average particle size of from 0.5 to 500 μm alternatively 0.5 to 250 μm, alternatively 0.5 to 100 μm, alternatively 0.5 to 75 μm, alternatively 1.0 to 50 μm (determined, if required, by the method described above), which are thermally stable up to a temperature of at least 180 °C (determined, using the method described above). Component (v) is present in the composition in an amount of from 5 to 35 wt. %, of the composition, alternatively in an amount of from 5 to 30 wt. % of the composition, alternatively, in an amount of from 5 to 25 wt. % of the composition.

The total wt. % of the composition including components (i) to (v) and any additives is 100 wt. % but may be any suitable combination of the above.

The order for mixing components in the hydrosilylation curable silicone elastomer composition of the leather coating composition is not critical. Suitable parts A and B are prepared and then part A and part B are mixed together in a predetermined ratio between 15:1 and 1:2 e.g., for the sake of example, a 1:1 ratio shortly prior to use.

Curing of the hydrosilylation curable silicone elastomer composition of the leather coating composition may be carried out at a suitable temperature for hydrosilylation cure. For example, a cure temperature of from about 80 °C to 180 °C, alternatively from 80 °C to 150 °C, alternatively of from 80 °C to 130 °C.

The leather coating composition as described is utilised as a topcoat for synthetic leather materials, particularly silicone-based synthetic leather composite materials, because once cured it provides outstanding abrasion and scratch resistance protection. The leather coating composition may also be applied to various other types of leather, for example conventional leather, nubuck or suede. The leather coating composition as hereinbefore described may be applied to finished leather or during the final wet stage in finishing leather but is preferably used as a topcoat for synthetic leather, particularly silicone-based synthetic leather composite materials. Leather having a topcoat in the form of a reaction product from the cure of the leather coating composition described above has a greatly increased abrasion resistance. This increase in abrasion resistance is achieved without detriment to the compatibility and the flexibility of the final coating; other additives often used to increase abrasion resistance may harshen the touch of the coated leather and increase resistance to bending, causing cracks in the structure of the coating.

BRIEF DESCRIPTION OF THE DRAWINGS

The application and uses of the leather coating composition as hereinbefore described will be more apparent from the following further description taken in conjunction with the accompanying Figures in which.

Figure 1:
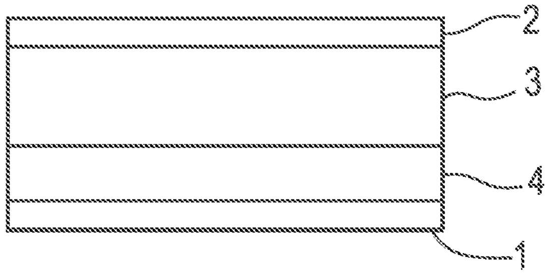
FIGS. 1-4 are cross-sectional views showing the layers in the structure of a silicone-based synthetic leather composite material during or post manufacture.

DETAILED DESCRIPTION OF THE METHODS OF MAKING A SILICONE-BASED SYNTHETIC LEATHER COMPOSITE MATERIAL USING THE HYDROSILYLATION CURABLE SILICONE ELASTOMER COMPOSITION AS HEREINBEFORE DESCRIBED IN CONJUNCTION WITH THE AFOREMENTIONED FIGURES

A silicone-based synthetic leather composite material comprising a coating which is the reaction product from the cure of the leather coating composition (5) as hereinbefore described, may comprise several layers of cured liquid silicone rubber (3,4) each having a different function as well as a textile support layer (2). Excluding the topcoat which is made from the leather coating composition described herein, a silicone-based synthetic leather composite material comprises at least a textile support layer (2), an adhesive layer made from a first liquid silicone rubber material (3) and a second or skin layer (4) made from a second liquid silicone rubber material. The adhesive layer (3) is provided as an effective adhesive between the textile support (2) and the second (skin) layer (4). In use the adhesive or first layer (3) is adhered to the textile support layer (2) and adhered or laminated to the skin layer (4). The leather coating composition as hereinbefore described functions as a protective topcoat (5) which is a third layer on top of and bound to the skin layer (4), i.e., the second layer (4) is situated between the adhesive layer (3) and the topcoat layer (5).

Typically, a release liner (1) is provided to protect the external surface of the silicone-based synthetic leather composite material until required. Dependent on the process relied upon for making the silicone-based synthetic leather composite material. The release liner (1) may be included in the initial combination of layers adhered to the skin layer (4) or to the topcoat (5), dependent on the process preferred. In the former case the release liner (1) may be removed prior to application of the topcoat. In the latter case the topcoat is applied onto the skin before application of the release liner onto the topcoat, or the topcoat is first applied onto the release liner, before application of the additional layers.

The textile support layer (2) may be made from any suitable textile material for example woven, knitted or non-woven textiles made from synthetic resin fibers, natural fibers and/or, microfibers. These may include but are not restricted to polyester fiber, a viscose rayon fiber, a polyamide fiber, nylon, an acrylic fiber, a polyolefin fiber; cellulose fibers such as cotton; and elastic textile materials, such as spandex, may be used as may mixtures of any two or more of the above. The textile support layer is designed to enhance mechanical strength of silicone leather.

The leather coating composition as hereinbefore described (i.e., the topcoat layer (5)) is typically applied with a wet film thickness of 10 to 100 μm, alternatively 10 to 60 μm corresponding to a dry coating thickness of about 2 to 50 μm, alternatively 2 to 30 μm alternatively 5 to 25 μm. It can be cured at any suitable temperature, for example at about 80 °C to 180 °C, alternatively from 80 °C to 160 °C, alternatively of from 80 °C to 130 °C for a period of from for a suitable period, e.g., between 30 seconds and 20 minutes, alternatively 30 seconds to 10 minutes, alternatively 30 seconds to 5 minutes, alternatively 30 seconds to 2.5 minutes.

Any suitable liquid silicone rubber composition may be utilised as the adhesive or first layer (3). This must be able to adhere to the textile support layer (2) and typically once cured has a low durometer Shore A hardness e.g., between 20 and 40 and a soft hand feeling to the touch. A commercial example of a suitable hydrosilylation curable liquid silicone rubber composition designed to function as the adhesive layer (3) is Dowsil™ LCF 8400 Binder, from Dow Silicones Corporation. Dowsil™ LCF 8400 Binder is provided to the customer in a two-part form as is standard for a hydrosilylation curable composition to avoid premature cure and as such the two-parts of Dowsil™ LCF 8400 Binder are mixed together immediately prior to use.

The adhesive layer (3) may be of any desired dry thickness, for example 50 μm to 1 mm thick, alternatively 50 to 750 μm, alternatively 50 to 500 μm, alternatively 100 to 500 μm, alternatively 100 to 300 μm thick. It can be cured at any suitable temperature, for example at 125 to 180 °C, alternatively 130 to 170 °C, alternatively 135 to 160 °C for a suitable period of up to 20 minutes, alternatively 1 to 10 minutes, alternatively for a period of from 1.5 minutes to 5 minutes, alternatively 1.5 minutes to 4 minutes.

As previously indicated the first or adhesive layer (3) is designed to be sandwiched between and to adhere the textile support (2) to the second or skin coating layer (4).

The second or skin coating composition (4) as hereinbefore described is designed as a protective synthetic leather which is usually bonded to adhesive layer (3). and may be used alone or with a suitable topcoat (5) such as the one described herein. Any suitable liquid silicone rubber composition may be utilised to form the second or skin layer (4) which typically once cured has a larger durometer Shore A hardness than the first or adhesive layer (3) e.g., greater than or equal to (≥) 50, alternatively, greater than or equal to (≥) 60. Commercial examples of suitable liquid silicone rubber compositions curable to function as the second or skin layer (4) are Dowsil™ LCF 8300 Skin and Dowsil™ LCF 8500 Skin both from Dow Silicones Corporation, which given they are both hydrosilylation curable liquid silicone rubber compositions are again provided to the user in two-parts which are mixed together immediately prior to use to avoid premature cure in storage prior to use. Dowsil™ LCF 8300 Skin has a high shore A durometer value of about 65 and provides abrasion resistance and has compared to Dowsil™ LCF 8500 Skin a relatively low viscosity. The latter is much higher viscosity as it is a fumed silica reinforced version of the former having high mechanical strength. Often a mixture of Dowsil™ LCF 8300 Skin and Dowsil™ LCF 8500 Skin is used as the second or skin layer (4) to benefit from the advantages of both compositions.

The skin layer (4) may be of any suitable dry thickness, for example, the adhesive layer may be of any desired thickness, for example 50 μm to 1 mm, thick, 50 to 750 μm, alternatively 50 to 500 μm, alternatively 50 to 350 μm, alternatively 50 to 250 μm thick. If the skin layer was applied direct onto the release paper, and the average thickness of the skin layer was determined this was determined by measuring the length and width of a sample of release paper, coating the release paper with the, in this case, skin layer composition, curing same, weighing the resulting release paper coated and calculating the average thickness on the basis of the following formula:

average dry thickness of skinlayer=weight skin layer/(density*width*length)

The average dry coat thickness of each other layer where given, was determined in an analogous fashion by determining the weight of the respective layer and using the above formulation. In each case the density was determined in accordance with ASTM D792. The skin layer can be cured at any suitable temperature, for example at 100 to 150 °C, alternatively 110 to 135 °C, alternatively 110 to 125 °C for a period of from 30 seconds to 5 minutes, alternatively 30 seconds to 2.5 minutes.

If desired the final silicone leather product may be post cured at a temperature between about 75 °C and 180 °C, generally but not necessarily if desired towards the lower end of the range e.g., from 75 to 120 °C for from 2 to 48 hours, alternatively from 6 to 36 hours, alternatively from 10 to 24 hours.

Figure 2:
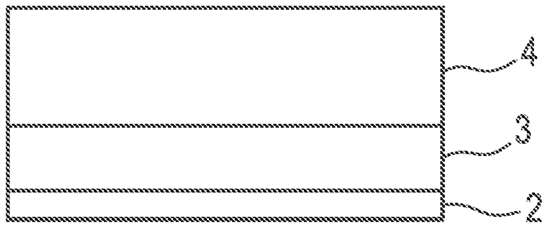

The leather coating composition as hereinbefore described may be applied as a topcoat on a preformed silicone-based synthetic leather composite material e.g. (2, 3, 4) as shown in FIG. 2 by any suitable coating method e.g. spraying, rolling, brushing, spin coating, dip coating, solvent casting, slot die coating, spray coating, knife coating, or gravure coating. The adhesive layer (3) and skin layer (4) may be applied via the same means.

The fabric layer may be adhered to the adhesive layer in any suitable manner e.g., lamination.

In such circumstances the preformed silicone-based synthetic leather composite material has typically been prepared by several alternative processes.

(i) applying a liquid silicone rubber skin type composition (4) onto a release liner (1),
(ii) curing the skin layer composition in (i) on the release liner (1) to form a cured skin layer (4);
(iii) applying a silicone adhesive composition onto the cured skin layer (4),
(iv) placing a textile support layer (2) on top of the adhesive layer (3) prior to or during cure of adhesive layer (3), such that the adhesive layer (3) is sandwiched between the skin layer (4) and the textile support layer (2);
(v) curing the adhesive layer (3); and
(vi) removing the release liner (1) as required.

The above is depicted in FIGS. 1 and 2 which depict a silicone-based synthetic leather composite material with the release liner present (FIG. 1) and without the release liner (FIG. 2). In the case of FIG. 2 the silicone-based synthetic leather composite material has been prepared and is now ready for application of the topcoat as hereinbefore described by any suitable application means (e.g., spraying, rolling, brushing, spin coating, dip coating, solvent casting, slot die coating, spray coating, knife coating, or gravure coating) as described above on top of the skin layer (4).

The leather coating composition as hereinbefore described is then applied on to the surface of the skin layer (4) from which the release liner (1) has been removed and is cured to form a protective topcoat on the silicone-based synthetic leather composite material.

In an alternative embodiment silicone-based synthetic leather composite material may be prepared in a continuous process with a topcoat using the leather coating composition as hereinbefore described in the continuous process. In this case the process followed may be:

(i) applying the leather coating composition as hereinbefore described on to a release liner (1),
(ii) curing the leather coating composition as hereinbefore described on the release liner (1) to form a cured topcoat (5);
(iii) applying a silicone skin layer on top of the cured topcoat (5);

(iv) curing the silicone skin layer to form a cured skin layer (4) such that the cured topcoat layer (5) is sandwiched between the release liner (1) and the cured skin layer (4);

(v) applying a silicone adhesive composition onto the cured skin layer (4), (vi) placing or laminating a textile support layer (2) on top of the uncured or curing adhesive layer (3); preferably the textile support layer is effectively laminated to the adhesive layer.

(vii) curing the adhesive layer (3) such that post-cure the adhesive layer (3) is sandwiched between the skin layer (4) and the textile support layer (2); and (viii) removing the release liner (1) as required.

Figure 3:
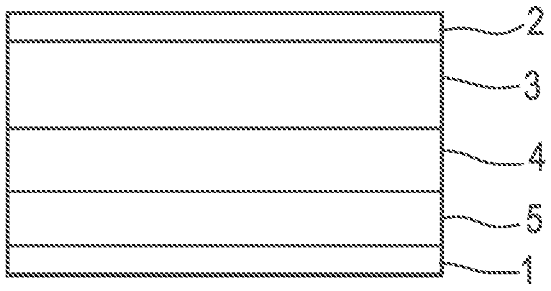
Figure 4:
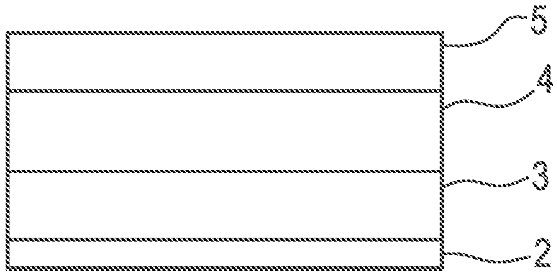

The different layers for such a process are depicted in FIGS. 3 and 4, wherein FIG. 3 depicts the release liner (1) present and FIG. 4 depicts the final silicone-based synthetic leather composite material with the release liner removed.

Any suitable release liner may be used for example super matting release paper ARX175DM from the Japan Asahi company, release paper DE-7, DE-90, DE-43C, DE-73J from the Japan Dai Nippon Printing Co., Ltd or semi-matting release paper DE-73M also from the Japan Dai Nippon Printing Co., Ltd. Each cure step may take place in a suitable oven, e.g., by curing and drying in a hot-air oven or may be undertaken in a conveyor oven in the case of a continuous process.

The above processes depict the preparation of a silicone-based synthetic leather composite material. The reader may appreciate that should the need arise additional layers may be introduced into the material if desired.

Synthetic leathers, particularly silicone-based synthetic leather composite materials may be designed to have a wide variety of properties given the content of the different layers, e.g. they may have excellent flame retardancy, smoke density, heat resistance, contamination resistance, solvent resistance, hydrolysis resistance, and the like as required for the end use of the leather. End uses envisaged include but are not limited to furniture, decoration, handbags, binders, luggage, garments, phone covers, covers for electronic goods, book covers, footwear, car interiors, car seats, wearable devices and/or medical beds/seats and the like.

EXAMPLES

In the following examples the hydrosilylation curable silicone elastomer composition which forms the leather coating composition and several comparatives were tested to show the advantage the coating herein described with respect to maintaining gloss after abrasion. All viscosities are measured at 25 °C relying on the cup/spindle method of ASTM D1084-16 Method B, using a Brookfield® rotational viscometer with spindle LV-4 (designed for viscosities in the range between 1,000-2,000,000 mPa·s) or a Brookfield® rotational viscometer with spindle LV-1 (designed for viscosities in the range between 15-20,000 mPa·s) for viscosities less than 1000 mPa·s and a rotation speed of 10 rpm unless otherwise indicated. Alkenyl and/or alkynyl content and Si—H content was determined using quantitative infrared analysis in accordance with ASTM E 168.

The ingredients used in the leather coating composition used together with the names given in the following Tables/examples are defined below:

Vinyl-terminated siloxane polymer is Dimethylvinyl terminated polydimethylsiloxane having a viscosity of 65,000 mPa·s at 25 °C having a vinyl content of about 0.08 wt. %;

High vinyl siloxane copolymer is a dimethylvinyl terminated dimethylmethylvinyl polysiloxane copolymer having a viscosity of 15,000 mPa·s at 25 °C and a vinyl content of about 8.0 wt. %;

Vinyl-terminated siloxane copolymer 2 is a dimethylvinyl terminated dimethylmethylvinyl polysiloxane copolymer having a viscosity of 300 mPa·s at 25 °C and a vinyl content of about 1.15 wt. %;

Fumed silica is HDK® T30P pyrogenic silica (Wacker Chimie) having a BET surface area of 300 $m^2/g$;

HMDZ is hexamethyldisilazane;

MVD (Methylvinyl diol) is a Dimethylhydroxy terminated polydimethylmethylvinylsiloxane having a viscosity of about 30 mPa·s at 25 °C and a vinyl content of about 12.0 wt. %;

Platinum catalyst is a platinum catalyst in a solution of polydimethylsiloxane having about 5000 ppm of platinum metal with respect to the rest of the composition;

Inhibitor is Methyl(tris(1,1-dimethyl-2-propynyloxy))silane;

Silicone elastomer powder is Dowsil® 23N Additive (Dow Silicones Corporation);

Resinous SiH crosslinker is Si—H dimethyl terminated resinous Si—H polysiloxane having a viscosity of 25 mPa·s at 25 °C and a silicon bonded hydrogen content of about 9,000 ppm;

Polyurethane microparticles are RHU-5070D Polyurethane microparticles from Dainichiseika-ave. particle size 1-10 μm (supplier information);

Acrylic microparticles 1 are Chemisnow® MZ-5HN by Soken Chemical & Engineering ave. particle size 1-10 μm (supplier information);

Acrylic microparticles 2 are Chemisnow® MX-40T by Soken Chemical & Engineering ave. particle size about 0.4 μm (supplier information);

Lubricant is a C24-28 olefin from Nanjing Chemical Material Corp.

Table 1 provides details of the starting materials used for the silica masterbatch in the composition described below. The fumed silica was mixed with the Vinyl-terminated siloxane polymer in the presence of the small molecules which acted as hydrophobing treating agents of the silica resulting in the in-situ treatment of the silica whilst the silica and polymer are being mixed. As previously indicated the polymer used may be component (i) or a mixture of component (i) and another polymer if desired but in this case no component (i) is present in the masterbatch.

TABLE 1

Fumed Silica Masterbatch

| | Wt. % |
|---|---|
| Fumed silica | 29.7% |
| Vinyl-terminated siloxane polymer | 62.4% |
| HMDZ | 5.5% |
| Divinyl teteramethyldisilazane | 0.3% |
| Methylvinyl diol (MVD)* | 0.35% |
| Water | 1.75% |

Several LSR compositions were prepared as examples (Ex. 1-4) and comparative examples (comp. 1-5) in two-part compositions. The total composition of each composition after part A and part B were mixed is depicted in Tables 2a (examples) and 3a (comparatives).

Prior to mixing, the part A composition incorporated the following:

High vinyl siloxane copolymer,
A proportion of the masterbatch,
Platinum catalyst,
Lubricants, when present, a proportion of micro-particles and diluent (when present). The diluent is designed to evaporate during the cure process.

The part B composition incorporated the following:
Remainder of the masterbatch,
Resinous SiH crosslinker,
Inhibitor when present, as well as the remainder of the micro-particles and any diluent present Diluent. The diluent is designed to evaporate during the cure process.

Shortly prior to use the Part A compositions and their respective part B compositions were mixed together in a 1:1 weight ratio to make the final hydrosilylation curable silicone elastomer composition under test.

TABLE 2a

Compositions of Examples (wt. %)

| | Ex. 1 | Ex. 2 | Ex. 3 | Ex. 4 |
|---|---|---|---|---|
| High vinyl siloxane copolymer | 22.46 | 22.46 | 24.43 | 18.87 |
| Masterbatch | 46.69 | 46.69 | 50.81 | 39.24 |
| Resinous SiH crosslinker | 14.43 | 14.43 | 12.72 | 12.14 |
| Lubricant | 5.35 | 5.35 | | 4.49 |
| Silicone elastomer powder | | | 3.88 | |
| Polyurethane microparticles | | 7.13 | | 24.95 |
| Acrylic microparticles 1 | 10.69 | 3.56 | 7.75 | |
| Inhibitor | 0.09 | 0.09 | 0.1 | 0.07 |
| Platinum catalyst | 0.29 | 0.29 | 0.31 | 0.24 |

Once prepared the topcoat composition was utilised in the preparation of a silicone-based synthetic leather composite material via the following process. The skin layer (4) used was a mixture of Dowsil™ LCF 8300 Skin and Dowsil™ LCF 8500 Skin and adhesive layer (3), was in the form of Dowsil™ LCF 8400 Binder and before curing this underwent a lamination bonding process to a microfiber-based textile layer (2) which combination was then cured at a temperature of 150 °C for a period of three minutes.

1) the mixture of the topcoat was applied onto a release liner and cured at a temperature of 120 °C for 1.4 minutes (min). The dry film thickness was determined to be about −10 μm.
2) The skin layer was then applied onto the topcoat and cured under the same condition. The thickness of the adhesive layer was 100-150 μm.
3) The adhesive layer was applied to the top of the skin layer and a lamination bonding process was employed to attach the fabrics. Then the combination was cured at 150 °C for 3 min. the thickness of the adhesive layer is 150-250 μm.
4) The release liners were then removed to obtain the top coated silicone leather samples, 5) Finally the silicone leather material was post-cured at a temperature of 80 °C for 16-20 hours.

The resulting silicone leather was then analysed using a Taber abrasion test using TABER® Abraser (Abrader) Model 5131 was used for the testing. The Taber abrasion test is used to evaluate the abrasion resistant performance of the leather samples. Three samples of each example or comparative underwent 500 cycles of abrasion using a CS-10 Wheel and a 1 kg weight. After the abrasion step and prior to evaluation, the abraded surface was cleaned with deionized water and allowed to air dry. Each sample was then visually assessed and any objectionable changes in gloss, color or texture were noted. To pass the test, there should be substantially no wear-through of the coating or any objectionable changes in gloss, color or grain.

The results for the examples having a topcoat in accordance with the disclosure herein are provided in Table 2b.

TABLE 2b

Properties of the topcoat

| | Ex. 1 | Ex. 2 | Ex. 3 | Ex. 4 |
|---|---|---|---|---|
| Taber, CS-10 | Pass | Pass | Pass | Pass |
| Gloss | Pass (SC) | Pass (SC) | Pass (SC) | Pass (SC) |
| Grain | Little change | Little change | Little change | Little change |
| Color | No change | No change | No change | No change |
| Wear-through | no | no | no | no |

(SC) stands for slight change.

The high crosslinking density due to the nature of the polymer and cross-linker is thought to restrict the chain mobility and thus minimized adhesive contact. This resulted in an abrasive pattern was avoided, and the gloss would not decrease after abrasion. On the other hand, micro-particles in the topcoat would appear on the surface after abrasion. As a result, although the small grains were worn away, the appeared micro-particles would help to compensate the loss of surface roughness, so as to avoid increased gloss.

Analogous testing was then carried out on silicone leather top coated with the comparative compositions using the same processes and test methods as described above. The compositions for the topcoats are depicted in Table 3a and the results are depicted in Table 3b.

TABLE 3a

Composition of comparative examples

| | Comp. 1 | Comp. 2 | Comp. 3 | Comp. 4 | Comp. 5 |
|---|---|---|---|---|---|
| High vinyl siloxane copolymer | | 25.14 | 20.59 | 18.87 | 22.46 |
| Vinyl-terminated siloxane copolymer 2 | 22.46 | | | | |
| Masterbatch | 46.69 | 52.28 | 42.80 | 39.24 | 46.69 |
| Resinous SiH crosslinker | 14.43 | 16.17 | 13.23 | 12.13 | 14.43 |
| Lubricant | 5.35 | 5.99 | 4.90 | 4.49 | 5.35 |
| Silicone elastomer powder | | | 18.14 | 24.95 | |
| Acrylic microparticles 1 | 10.69 | | | | |
| Acrylic microparticles 2 | | | | | 10.69 |
| Inhibitor | 0.09 | 0.1 | 0.08 | 0.08 | 0.09 |
| Platinum Catalyst | 0.29 | 0.32 | 0.26 | 0.24 | 0.29 |

TABLE 3b

Properties of the Comparative examples.

| | Comp. 1 | Comp. 2 | Comp. 3 | Comp. 4 | Comp. 5 |
|---|---|---|---|---|---|
| Taber, CS-10 | Fail, (SDG) | Fail, (SDG) | Fail, (SDG) | Fail, (SDG) | Fail, (SDG) |
| Δ gray value | 0.963 | 1.049 | 0.978 | 0.970 | 0.965 |

TABLE 3b-continued

| Properties of the Comparative examples. | | | | | |
|---|---|---|---|---|---|
| | Comp. 1 | Comp. 2 | Comp. 3 | Comp. 4 | Comp. 5 |
| gloss | Fail, (SDG) | Fail, (SDG) | Fail, (SDG) | Fail, (SDG) | Fail, (SDG) |
| grain | Little change | Little change | Little change | Little change | Little change |
| color | No change | No change | No change | No change | No change |
| Wear-through | no | no | no | no | no |

SDG stands for significant decrease in gloss and Δ gray value stands for the change in gray value.

Examples 1, 2 and 3 passed Taber test with no obvious change in glossiness. Comparative examples 1, 3, 4, 5 failed due to significantly decreased gloss, while comparative example 2 failed due to significantly increased gloss. It can be seen from Comp. 5 that the particle size of the microparticles needs to be at least 5 μm. In comp.1 Vinyl-terminated siloxane copolymer 2 is used instead of the High vinyl siloxane copolymer used in the examples. The elastomer resulting from curing comp. 1 has a lower crosslinking density and as such the necessity of High vinyl siloxane copolymer can be appreciated given the results in Table 3b.

What is claimed is:

1. A leather coating composition comprising a hydrosilylation curable silicone elastomer composition, comprising:

(i) one or more organopolysiloxane polymer(s) having a viscosity of from 1,000 to 500,000 mPa·s at 25 °C with at least 5 weight % of the polymer(s) being unsaturated groups selected from alkenyl groups, alkynyl groups or a mixture thereof as determined using quantitative infra-red analysis in accordance with ASTM E168;

(ii) a reinforcing silica filler which may optionally be hydrophobically treated;

(iii) a silicone resin cross-linker having terminal (M) groups comprising silicone bonded hydrogen, wherein the molar ratio of Si-H groups in component (iii) to unsaturated groups in the composition is from 0.5:1 to 20:1;

(iv) a hydrosilylation catalyst; and (v) silicon-free organic microparticles having a number average particle size of from 0.5 to 500 μm, determined using a field emission scanning electron microscope, which are thermally stable up to a temperature of at least 180 °C and which silicon-free organic microparticles are present in the leather coating composition in an amount of from 5 to 35 weight %.

2. The leather coating composition in accordance with claim 1, wherein component (iii) of the hydrosilylation curable silicone elastomer composition comprises one or more of the following:

silicone resins comprising or consisting of Si—H containing M groups, $(CH_3)_3SiO_{1/2}$ groups and $SiO_{4/2}$ groups, silicone resins comprising or consisting of Si—H containing M groups and $SiO_{4/2}$ groups, silicone resins comprising or consisting of Si—H containing M groups, $(CH_3)_2SiO_{2/2}$ groups and $SiO_{4/2}$ groups, or silicone resins comprising or consisting of Si—H containing M groups, $SiO_{4/2}$ groups and $(C_6H_5)_3SiO_{1/2}$ groups, and alternatives in which methyl is replaced by phenyl groups or other alkyl groups or mixtures thereof and wherein each of the above may include one or more T groups.

3. The leather coating composition in accordance with claim 1, wherein the silicon-free organic microparticles of component (v) of the hydrosilylation curable silicone elastomer composition are selected from polyurethane microparticles, acrylic microparticles, methacrylic microparticles, polytetrafluoroethylene microparticles, polyester microparticles, polyamide microparticles, polyolefin microparticles, and derivatives and/or mixtures thereof.

4. The leather coating composition in accordance with claim 1, wherein the silicon-free organic microparticles of component (v) of the hydrosilylation curable silicone elastomer composition comprise one or more of polyethylene, polystyrene, polyvinyl acetate, polyvinyl chloride, polyvinylidene chloride, polyacrylonitrile, polymethyl methacrylate, polybutadiene, polychloroprene, and other vinyl polymers and copolymers thereof; Nylon 6, Nylon 66, and other polyamides; or polyethylene terephthalate, polyacetal, and blends thereof.

5. The leather coating composition in accordance with claim 1, wherein the composition additionally comprises one or more of the following additives: cure inhibitors, cured silicone elastomer powder, pot life extenders, lubricants, diluents, flame retardants, pigments, colouring agents, heat stabilizers, compression set improvement additives, anti-squeak agents and mixtures thereof.

6. The leather coating composition in accordance with claim 5, wherein the lubricant is present and is a reactive lubricant.

7. The leather coating composition in accordance with claim 1, wherein the silicon-free organic microparticles of component (v) of the hydrosilylation curable silicone elastomer composition have a number average particle size of from 0.5 to 100 μm determined using a field emission scanning electron microscope.

8. The leather coating composition in accordance with claim 1, which is suitable for a topcoat composition for a silicone-based synthetic leather composite material.

9. A silicone-based synthetic leather composite material comprising a topcoat which is the reaction product of the composition in accordance with claim 1 obtained upon cure.

10. The silicone-based synthetic leather composite material in accordance with claim 9, comprising a textile support layer selected from one or more of polyester fiber, a viscose rayon fiber, a polyamide fiber, nylon, an acrylic fiber, a polyolefin fiber; cellulose fibers and elastic textile materials.

11. The silicone-based synthetic leather composite material in accordance with claim 9, in or suitable for furniture, decoration, handbags, binders, luggage, garments, phone covers, covers for electronic goods, book covers, footwear, car interiors, car seats, wearable devices and/or medical beds/seats.

12. The leather coating composition in accordance with claim 1, as a topcoat for a synthetic leather, wherein once cured, the topcoat minimizes the change in gloss thereof subsequent to abrasion.

* * * * *